United States Patent
Moulton et al.

(10) Patent No.: US 7,156,127 B2
(45) Date of Patent: Jan. 2, 2007

(54) CURRENT CARRYING STRETCH HOSE

(75) Inventors: Gregory Moulton, Greenwood, SC (US); Roy Herron, Starr, SC (US); Stephen Mountford, Abbeville, SC (US); Thomas Dove, Calhoun Falls, SC (US)

(73) Assignee: Flexible Technologies, Inc., Abbeville, SC (US)

( * ) Notice: Subject to any disclaimer, the term of this patent is extended or adjusted under 35 U.S.C. 154(b) by 0 days.

(21) Appl. No.: 10/023,473

(22) Filed: Dec. 17, 2001

(65) Prior Publication Data

US 2003/0111126 A1 Jun. 19, 2003

(51) Int. Cl.
*F16L 11/112* (2006.01)

(52) U.S. Cl. ............... 138/122; 138/127; 138/133; 138/138

(58) Field of Classification Search .......... 138/122, 138/127, 129, 134
See application file for complete search history.

(56) References Cited

U.S. PATENT DOCUMENTS

| | | | | |
|---|---|---|---|---|
| 2,890,264 A | * | 6/1959 | Duff ........................ | 174/47 |
| 2,927,625 A | * | 3/1960 | Rothermel et al. ........ | 156/144 |
| 2,954,802 A | * | 10/1960 | Duff ........................ | 138/122 |
| 2,963,750 A | * | 12/1960 | Pavlic ...................... | 156/144 |
| 2,998,474 A | * | 8/1961 | Pavlic ...................... | 174/47 |
| 3,080,891 A | * | 3/1963 | Duff ........................ | 138/122 |
| 3,486,532 A | * | 12/1969 | Sawada .................... | 138/122 |
| 4,230,899 A | * | 10/1980 | Kanao ...................... | 174/47 |
| 4,354,051 A | * | 10/1982 | Kutnyak ................... | 174/47 |
| 4,489,759 A | * | 12/1984 | Yamamura ................ | 138/122 |
| 4,693,324 A | * | 9/1987 | Choiniere et al. ......... | 174/47 |
| 5,416,270 A | * | 5/1995 | Kanao ...................... | 174/47 |
| 5,555,915 A | * | 9/1996 | Kanao ...................... | 138/33 |
| 6,024,132 A | * | 2/2000 | Fujimoto .................. | 138/122 |
| 6,103,971 A | * | 8/2000 | Sato et al. ................ | 174/47 |
| 2003/0098084 A1 | * | 5/2003 | Ragner et al. ............ | 138/129 |

* cited by examiner

*Primary Examiner*—James Hook
(74) *Attorney, Agent, or Firm*—Thomas A. O'Rourke; Bodner & O'Rourke, LLP

(57) ABSTRACT

An improved flexible hose for carrying fluids is disclosed. The hose has a first end and a second end, and is typically in a retracted position when no tensile force placed on an end of the hose and in an extended condition when a tensile force of a pulling nature is placed on an end of the hose. The hose has a thermoplastic cover on its outer surface. The thermoplastic cover has an interior surface and an exterior surface. On the interior surface there is a helical member adhered thereto this helical member being comprised of a material capable of carrying a current of electricity. The hose of the present invention stretches at least 100 percent over its at rest position when a pulling force is placed on one end of the hose.

10 Claims, 3 Drawing Sheets

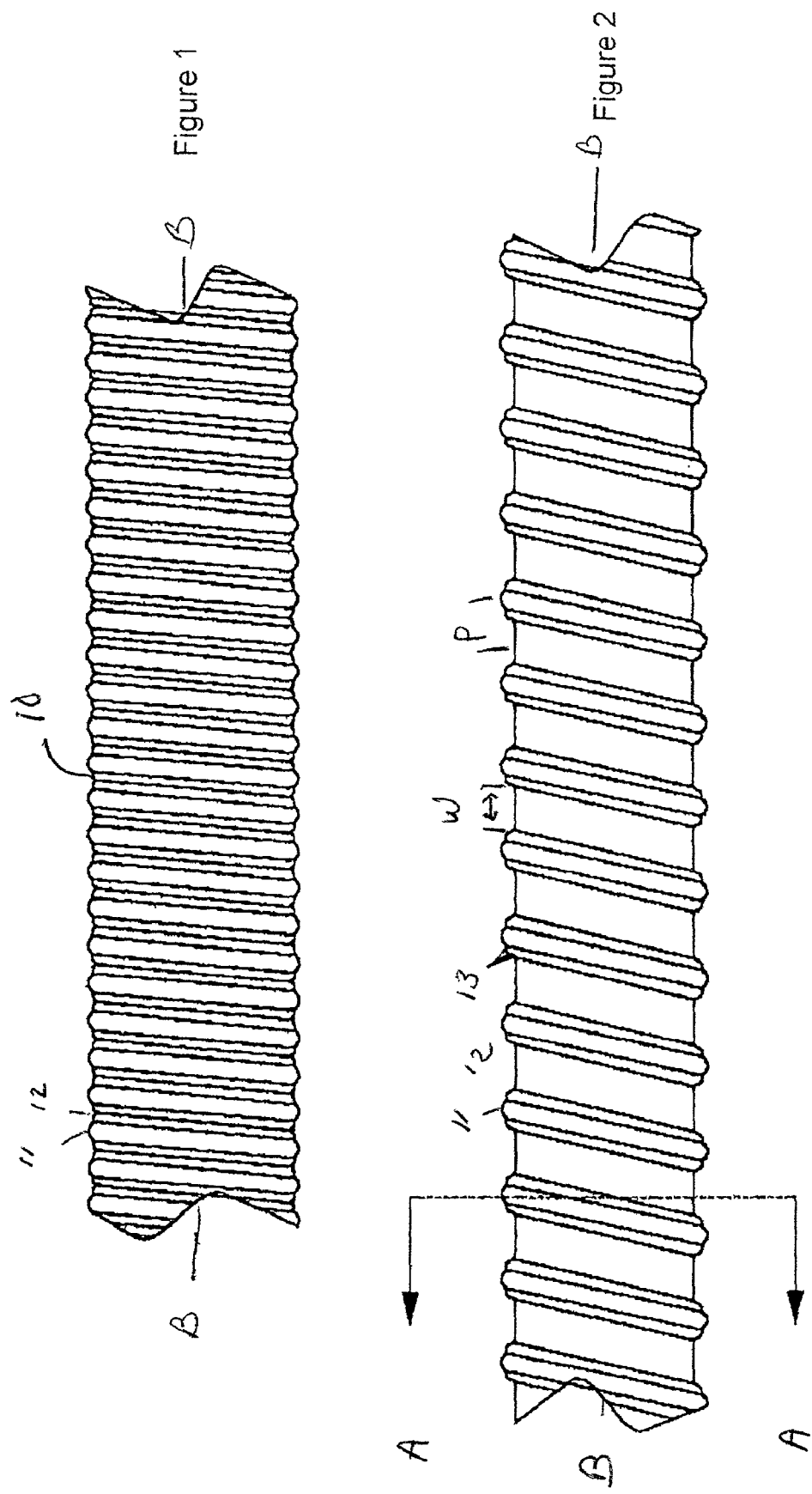

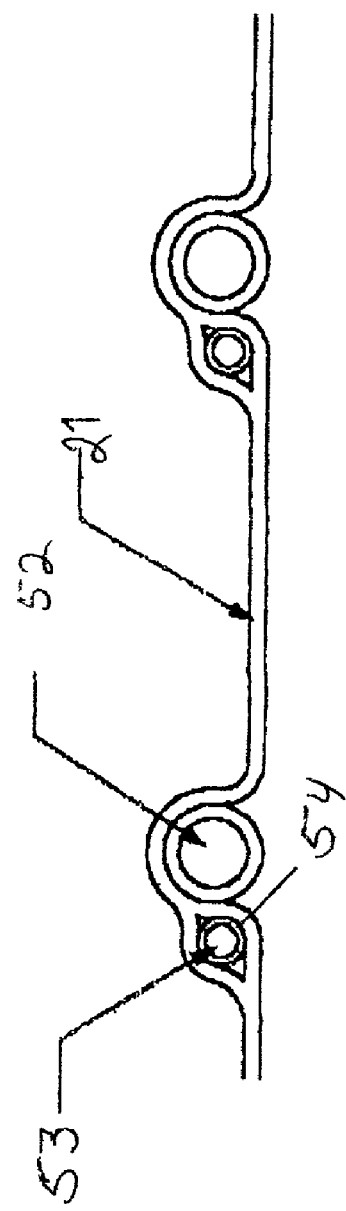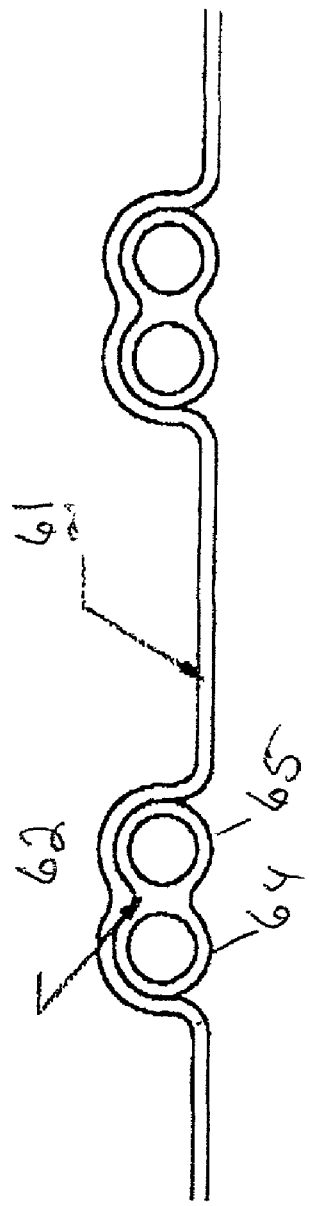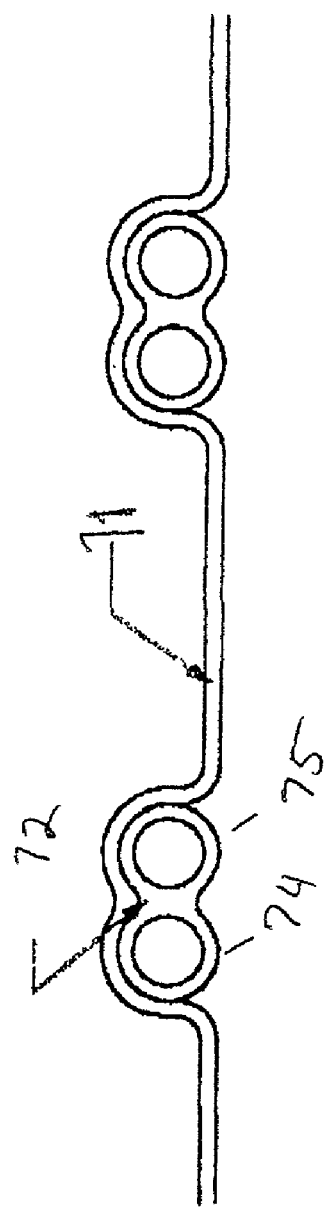

CURRENT CARRYING STRETCH HOSE

FIELD OF THE INVENTION

The present invention relates to improvements in flexible hose and relates in particular to a current carrying stretch hose.

BACKGROUND OF THE INVENTION

Flexible hose or conduit is used in a variety of applications. These applications may include the transportation of fluids such as liquids and gases from one location to another. In heating, ventilation and air conditioning (HVAC) systems for example, flexible hose or ducting may be used to transport cooled or heated air for ventilation purposes from one location to another. Flexible hose may also be used to remove exhaust from a location. Another application for flexible hose or conduit is in the area of vacuum systems that are used for the removal of debris or particulate matter from an area. Flexible hose is typically comprised of a body which is usually generally circular in cross section and provided with at least one connection means at one end of the hose for connecting the flexible hose to an apparatus for moving the transported medium through the hose. The other end of the flexible hose can have any one of a number of attachments present. In the area of flexible hose for vacuum cleaners for example, the attachments may include an assortment of brushes that may connect directly to the end of the hose or to one or more wands.

Preferably, the hose is made of a material that is impermeable to fluids to prevent leakage and also resistant to punctures and tears. Flexible hose is typically made of a thermoplastic material that provides flexibility and some measure of strength. As the thermoplastic material is made thinner to provide greater flexibility there is increased risk of tears and punctures due to the thin sidewall of the hose. If the thermoplastic material is made thicker to reduce the risk of tears and punctures there is a tendency for the hose to lose the necessary flexibility. Flexibility is important in many applications because the hose is bent during use or must bend around obstacles as it is used. Flexibility is also important in many applications where the hose is compressed or stretched by the user to fit a piece of hose to a given area or location. Strength is important not only in the area of punctures and tears but also in connection with crushing or kinks. Hose that is exposed and not buried in the wall or a ceiling of a building may be subjected to crushing forces due to dropped objects, stepping on the hose, etc. In addition, as the hose is bent, the hose needs to retain its inner diameter as much as possible to prevent the hose from blocking circulation. As a result, the hose must exhibit sufficient strength or flexibility to prevent crushing when a load is placed on the hose and/or the ability to revert to generally its initial configuration when a load is removed from the hose.

In many instances, the thermoplastic material that is the outer covering of the hose is reinforced by a helical member that is imbedded in or adhered to the inner or interior wall of the thermoplastic material. The helical member may be a metallic or non-metallic material. This helix is adhered to the inner surface of the thermoplastic covering usually during the extrusion process or by means of a suitable solvent that bonds the helix to the thermoplastic outer wall of the hose. A metal helix is usually covered with a plastic material or cloth so that the surface of the metal is not in contact with the interior of the hose. The helix provides strength to the hose and helps prevent the hose from being crushed. The helix also provides additional flexibility to the hose from the standpoint of permitting it to be stretched slightly.

In the area of vacuum hose i.e., hose that is used in applications where the hose is used to remove particulate matter from a material, there are a number of types of vacuum systems currently available on the market. Many commercially available vacuum cleaning systems today are relatively portable and have a housing that includes a filter chamber, a vacuum motor located in the vicinity of one end of the filter chamber and a hose connected to the filter chamber. The motor provides the suction force for removing the particulate matter. The housing may for example be in the form of a portable "canister." The vacuum chamber may for example house a receptacle or bag for containing the particulate matter picked up through the hose by the motor. The vacuum system may also be an "upright" vacuum. Although a use is not always used in an upright vacuum, there are many models currently available where a hose and various attachments may be connected to the upright vacuum to increase its versatility. The vacuum system may also be part of a central vacuum system in a building where there is one or more stationery motors located in the building in a fixed position and there are a plurality of hoses or ducts within the walls of the building which extend from the motor to each room in the structure. These internal hoses have a connection means at the wall surface whereby a flexible hose may be attached so that the room may be vacuumed. In this system the user does not have to carry a heavy canister throughout the premises.

One type of vacuum hose that is currently available is a current carrying hose which has embedded in the hose the necessary wiring to carry current from one end of the hose to the other. This is useful in many vacuum cleaner applications where for example a light bulb or cleaning tool such as rotating brushes are present at the end of a hose or wand that is connected to the hose. In order for the light or brushes to work there must be a means for extending current from the housing to the fixture. Heretofore, current carrying hose was rather rigid and was incapable of stretching to extend its length a significant distance.

Another type of hose that is presently available is known as a stretch hose. While most flexible hose has some ability to stretch a short distance stretch hose typically can stretch a distance 2 to 6 times its at rest length. The benefit of a stretch hose is that as the user is working a manageable length of hose is carried. For example, when vacuuming a floor the canister need not constantly roll behind the user because the hose can stretch to cover a greater area without having to move the canister. In addition, for both upright, canister and built-in systems the stretch hose is useful on stairs or to reach the tops of cabinets, drapes and other high areas where an ordinary hose cannot reach without additional wands or extensions. Once the extra length of hose is no longer needed the stretched hose retracts to its normal, more compact configuration.

SUMMARY OF THE INVENTION

The present invention is directed to improved flexible hoses or ducts that have the attributes of a stretch hose of being able to expand when a pulling force is placed on an end of the hose and which retracts to the original at rest configuration when the pulling force is released. The flexible hoses or ducts of the present invention also are current carrying hoses that permit the hose of the present invention to be used in applications where a power source is needed at an end of the hose or duct. The flexible stretch hoses of the present invention are capable of carrying low voltage, high voltages or low/high voltage which increases the usability of the hose for a number of different applications.

The current carrying stretch hoses of the present invention include an embodiment wherein the prior art helix of the hose is replaced by a combination of a conductor and a helix as described in detail below.

OBJECTS OF THE INVENTION

It is an object of the invention to provide an improved flexible hose that has the ability to stretch when a pulling force is applied to a length 2 to 6 times its at rest length that is also a current carrying hose.

It is an object of the invention to provide current carrying stretch hoses that have two or more conductors in a helical configuration in a stretch hose that can be used in low voltage, high voltage or low/high voltage applications.

BRIEF DESCRIPTION OF THE DRAWINGS

FIG. 1 is a side view of the flexible hose of the present invention in its fully retracted condition.

FIG. 2 is a side view of the flexible hose of the present invention in its extended condition.

FIG. 6 is a still further embodiment of the hose of FIG. 2 along Section A—A.

FIG. 7 is another embodiment of the hose of FIG. 2 along Section A—A.

FIG. 8 is a still further exemplary embodiment of the hose of FIG. 2 along Section A—A.

DETAILED DESCRIPTION OF THE INVENTION

Figure 3:
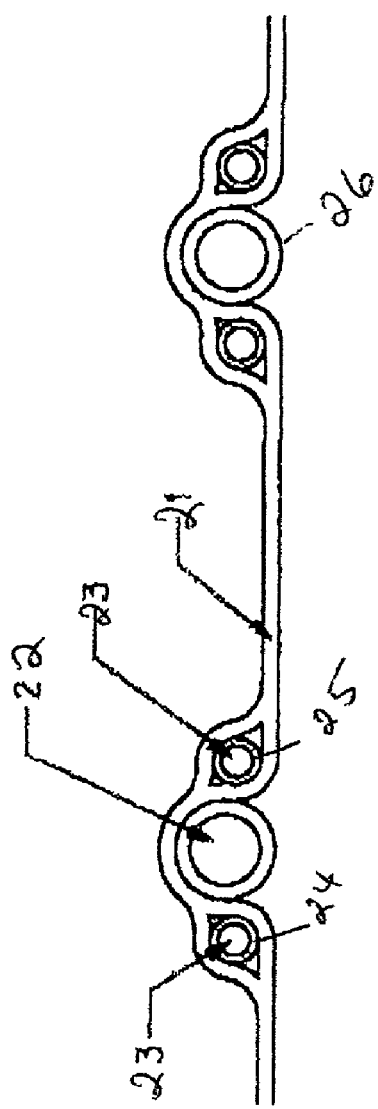
FIG. 3 is a cut away view of the hose of FIG. 2 along Section A—A.

As seen in FIG. 1 there is the hose 10 of the present invention that is in a fully retracted position. The fully retracted position of the hose is its compressed configuration, i.e., when there is no tensile force placed on the ends of the hose. In its retracted condition the hose is at a length that makes it convenient to store. When the hose has a stress placed on it in a pulling nature i.e., the hose of FIG. 1 expands from its compressed configuration to reach an extended length as shown in FIG. 2. One advantage of a stretch hose is that in its compressed position, the hose takes up minimal space and can be stored or carried easily. During use, as a pulling force is placed on the hose, the hose readily bends due to its flexible construction. In addition, as the user tries to reach many locations during use, the hose is capable of stretching to a length that is 2 to 6 times its fully retracted length. While many flexible hoses have some stretchability, the amount of stretch is typically only of the order of 5% when 10 pounds of pull is placed on the hose, while a true stretch hose as that term is used in the industry stretches at least 100 percent over its fully retracted length when 10 pounds of pull is placed on the hose. The present invention has a construction that permits the current carrying hose to stretch or extend in a range of at least 100 percent over its fully retracted length when 10 pounds of pull is placed on the hose.

As seen in FIGS. 1 and 2 the hoses of the present invention are corrugated and has a plurality of peaks or crests 11 and valleys 12 that are interconnected by sidewalls 13 that extend generally at an angle to the peaks and valleys. When in the compressed configuration, the valleys are virtually eliminated and the sidewalls 13 on opposite sides of a valley are generally in contact. When the hose is in an at rest position, the valleys typically are more U-shaped than V-shaped. As the hose is expanded further when a pulling force is applied, the valleys become broader or wider and the angle of the sidewalls stay generally the same. As shown in FIG. 2, the valleys have generally flat apices. The apices can have a width "W" of approximately ¼" to ¾" inches in a direction parallel to the longitudinal axis B—B of the hose. The corrugations can have a pitch "P" that is approximately from ⅜" to 1". The hose may be made of any diameter that is desired for the application.

The hoses of the present invention has a thermoplastic cover 21 that may be a polymeric material, preferably any thermoplastic material such as ethylene vinyl acetate (EVA), polyvinyl chloride (PVC) and others. The thermoplastic cover typically has a thickness in the range of about 10 mil to 50 mil. Within the peaks of the corrugations is the helix 22 of the hose. The helix 22 may be any material that retains its shape and configuration in the hose, such as a metal or plastic wire. Preferably, the helix is a steel or a copper clad steel wire helix with a thermoplastic jacket or insulation around it. The wire may be retained in place in the hose by a suitable solvent. One such suitable solvent is DB Acetate. The helix may also be a fiber optic material.

One of the important features of the present invention is that the stretch hose has the ability to carry current. Current carrying hoses are useful in applications where for example, the vacuum cleaner has a light or motor driven cleaning device at the end of the hose or wand. In order for the light or cleaning device to operate, current is necessary. Where the helix is intended to carry a current the helix is preferably made of a suitable conductive material such as a copper clad steel wire. In one embodiment of the invention, the structural helix is a copper-clad steel wire. The structural helix 22 may also have an insulated covering 26 and be used as a conductor. As seen in FIG. 3, on opposite sides of the helix 22 are two insulated conductor wires 24 and 25. These wires 24 and 25 are laid on either side of the helix 22. These wires 24 and 25 are preferably stranded copper wire of a gauge in the range of about 10 to about 30 with a thermoplastic jacket as the insulation. It will be appreciated by those skilled in the art that other types of conductive wires may be used besides stranded copper wire and copper clad steel wire. The conducting wires 24 and 25 and the helix 22 may be used in both low and high voltage applications. By low voltage it is meant less than 120 volts. High voltage applications include voltages higher than 120 volts.

In manufacture of the hose of the present invention, the helix 22 and the wires 24 and 25 are laid down around a mandrel and the thermoplastic cover is extruded over the helix and the wires as is well known in the art. Alternatively, the thermoplastic cover may be extruded around the wires and over the structural helix 22. If desired the helix 22 and the wires 24 and 25 may be coated with a solvent over a portion of their surfaces to improve adhesion to the thermoplastic cover.

Figure 4:
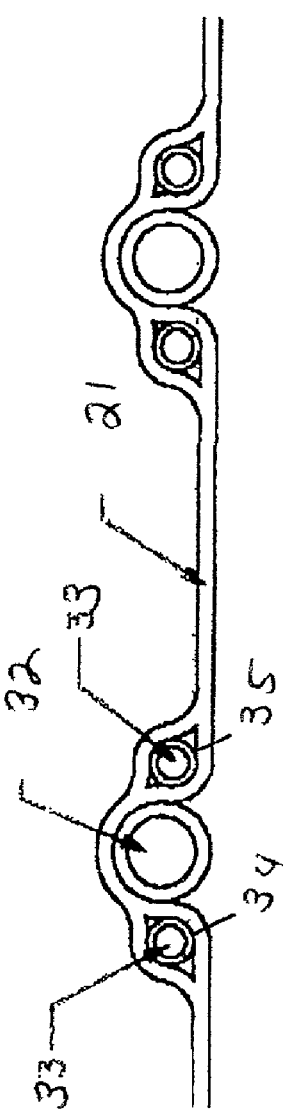
FIG. 4 is an alternate exemplary embodiment of the hose of FIG. 2 along Section A—A.

As seen in FIG. 4 the structural helix 32 may be a thermoplastic covered steel wire. The steel wire may have a gauge of about 12 to about 21. On opposite sides of the helix 32 are two conductor wires 34 and 35. Two individual conductors 33 are each individually insulated usually by a thermoplastic material. These wires 34 and 35 are laid on either side of the helix 32. These wires 34 and 35 are preferably stranded copper wire of a gauge in the range of about 10 to about 20 with a thermoplastic jacket as the insulation. The structural helix 32 can also be used as a low voltage conductor. The conducting wires 34 and 35 may be used in both low and high voltage applications.

Figure 5:
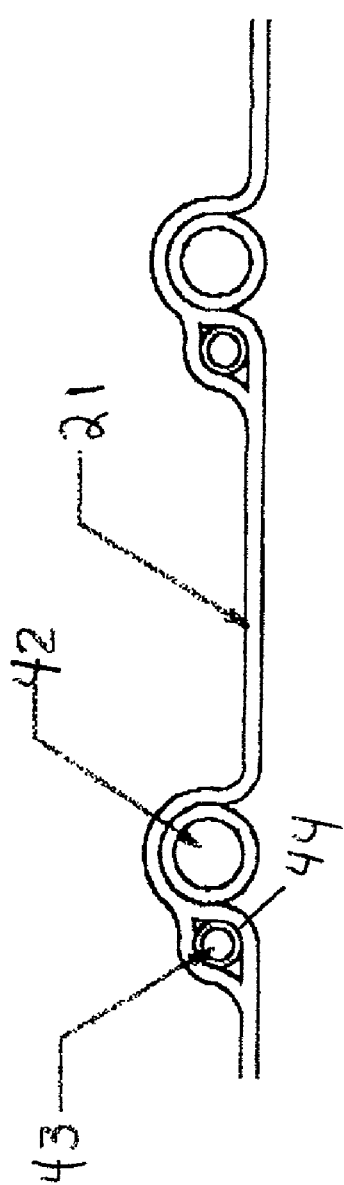
FIG. 5 is another embodiment of the hose of FIG. 2 along Section A—A.

FIG. 5 shows the helix 42 of an insulated copper clad steel wire with a single conductor wire 44 adjacent thereto. The copper clad steel wire may have a gauge of about 12 to about 21. The individual conductor 43 is insulated. The wire 44 can be laid on either side of the helix 42. The wire 44 is preferably stranded copper wire of a gauge in the range of about 10 to about 30 with a thermoplastic jacket as the insulation. The structural helix 42 can also be used as a conductor is desired. The conducting wires 44 and the helix 42 may be used in both low and high voltage applications.

As seen in FIG. 6 the structural helix 52 may be a thermoplastic covered steel wire. The steel wire may have a gauge of about 12 to about 21. On one side of the helix 52 is a conductor wire 54. The individual conductor 53 is insulated usually by a thermoplastic material. The wire 54 may be laid on either side of the helix 52. The wire 54 is preferably stranded copper wire of a gauge in the range of about 10 to about 30 with a thermoplastic jacket as the insulation. The structural helix 52 can also be used as a low voltage conductor. The conducting wire 54 may be used in both low and high voltage applications.

FIG. 7 shows the structural helix 62 to be a pair of conductors 64 and 65. These wires 64 and 65 are a copper clad steel wire and a stranded copper wire respectively that are both separately insulated and coated with the thermoplastic cover 61. The side-by-side coating of the two wires gives a "figure 8" style to the cross section of the helix. The copper clad steel wire and the stranded wire can be used as high or low voltage conductors.

FIG. 8 shows the structural helix 72 to be a pair of conductors 74 and 75. These wires 74 and 75 are a steel wire and a stranded copper wire respectively that are both separately insulated and coated with the thermoplastic cover 71. The side-by-side coating of the two wires gives a "figure 8" style helix. The steel wire can be used as a low voltage conductor and the stranded wire can be used as high or low voltage conductor.

We claim:

1. A flexible hose for carrying fluids said hose being in a retracted condition when no tensile force is placed on said hose and in an extended condition when a tensile force of a pulling nature is placed on a section of said hose, said hose consisting essentially of:
   a first end;
   a second end;
   a thermoplastic cover consisting essentially of a single layer of thermoplastic material having a thickness of between about 10 mil to 50 about mil wherein said thermoplastic cover further comprises an interior surface and an exterior surface;
   a single helical member, capable of retaining its shape in said hose adhered to said interior surface of said thermoplastic cover, said helical member being comprised of a material capable of carrying a current of electricity said helical member being capable of extending when a tensile force of a pulling nature is applied and then retracting to roughly the original shape when a force is not applied said helical member having a gauge between 12 and 21;
   a plurality of peaks and valleys in said thermoplastic cover caused by said helical member, said peaks having a distance between them, said helical member being interconnected by sidewalls that extend at an angle to the peaks and valleys wherein when said hose is in a retracted condition, the valleys generally U-shaped and when a pulling force is applied to a section of said hose, the valleys become wider and the angle of the sidewalls stay generally the same;
   the distance from one peak to an adjacent peak in the hose is about ¼" to ¾" when there is no pulling force on a section of said hose and the distance from one peak to an adjacent peak is about ½" to 2" when a pulling force is placed on a section of said hose;
   wherein the length of said hose in said extended condition is about two to about six times greater than the length in said retracted position; and
   a conductor wire, capable of carrying a current of electricity with a gauge in the range of about 10 to about 30 said conductive wire being disposed on at least one side of said helical member said thermoplastic cover having been extruded around said conductive wire.

2. The flexible hose according to claim 1 wherein there is a second conductive wire on the opposite side of said helical member, said thermoplastic material having been extruded around said second conductive wire.

3. The flexible hose according to claim 2 wherein one of said conductors is a copper clad steel wire.

4. The flexible hose according to claim 2 wherein the second conductive wire is stranded copper wire of a gauge in the range of about 10 to about 30 with a thermoplastic jacket as the insulation.

5. The flexible hose according to claim 4 wherein the helix comprises a steel wire.

6. The flexible hose of claim 1 wherein the valleys are virtually eliminated and the sidewalls on opposite sides of a valley are generally in contact with each other when said flexible hose is in a retracted position.

7. The flexible hose according to claim 1 wherein the conductive wire is stranded copper wire of a gauge in the range of about 10 to about 30 with a thermoplastic jacket as the insulation.

8. The flexible hose according to claim 1 wherein the cross section of the helix is in the shape of a figure 8.

9. The flexible hose of claim 1 wherein said hose has a pitch that is constant along the length of the hose.

10. The flexible hose according to claim 1 wherein said hose extends at least 100 percent over the fully retracted length of said hose when 10 pounds of pull is placed on an end of said flexible hose.

* * * * *